United States Patent [19]

Gilles et al.

[11] Patent Number: 4,863,597
[45] Date of Patent: Sep. 5, 1989

[54] DEWATERING DEVICE WITH SCREEN ASSEMBLY HAVING RELEASABLE FASTENING MEANS

[75] Inventors: Stephen R. Gilles, Elberfeld, Ind.; William F. Bogard, Galesburg, Ill.; Robert E. Moser, Denver, N.C.

[73] Assignee: W. S. Tyler, Incorporated, Gastonia, N.C.

[21] Appl. No.: 183,551

[22] Filed: Apr. 19, 1988

[51] Int. Cl.$^4$ ............................................. B01D 35/30
[52] U.S. Cl. ..................... 210/232; 210/389; 210/456; 209/395; 209/399
[58] Field of Search .................... 210/232, 389, 456; 209/275, 281, 395, 399

[56] References Cited

U.S. PATENT DOCUMENTS

| Re. 20,533 | 10/1937 | Dustan | 209/399 |
| 2,872,041 | 2/1959 | Fontein et al. | 209/273 |
| 2,916,142 | 12/1959 | Fontein | 209/274 |
| 3,508,650 | 4/1970 | Carr | 209/399 |
| 3,980,555 | 9/1976 | Freissle | 209/408 |
| 4,113,626 | 9/1978 | Detcher | 210/456 |
| 4,141,821 | 2/1979 | Wolff | 209/405 |
| 4,278,535 | 7/1981 | Wolff | 209/399 |
| 4,409,099 | 10/1983 | Wolff | 209/399 |
| 4,519,902 | 5/1985 | Kinder | 209/234 |
| 4,670,136 | 6/1987 | Schmidt et al. | 209/399 |
| 4,757,664 | 7/1988 | Freissle | 209/399 |

FOREIGN PATENT DOCUMENTS 2736662 2/1979 Fed. Rep. of Germany ...... 209/395
4630234 9/1971 Japan .................................. 209/395

OTHER PUBLICATIONS

Tabor Machine Company Brochure 8599-L, re "Tabor Radii—VIB".
C—E Tyler Brochure, re "Button Down Screen Modules".

Primary Examiner—Richard V. Fisher
Assistant Examiner—Cynthia L. Nessler
Attorney, Agent, or Firm—William W. Habelt

[57] ABSTRACT

The screen deck assembly of the present invention comprises a support frame, a screen member adapted to be removably mountable to the support frame, and releasable fastening means for mounting the screen member to the support frame, which in turn is fixedly mounted to the structure of the dewatering apparatus. The fastening means are readily releasable so that the screen member may be dismounted from the support frame, reversed and remounted by again engaging the fastening means into the reassembled screen member and support frame. The fastening means comprises a sleeve member and a pin member adapted for insertion into the sleeve member. The sleeve member has an elongated axially extending hollow cylindrical member which has an annular ring extending radially outwardly therefrom at one end and a plurality of axially extending slits cut in the other end thereof. The annular ring portion of the sleeve abuts against a washer-like ring mounted to the screen member when the sleeve is inserted into a hole in the screen member.

1 Claim, 3 Drawing Sheets

DEWATERING DEVICE WITH SCREEN ASSEMBLY HAVING RELEASABLE FASTENING MEANS

BACKGROUND OF THE INVENTION

The present invention relates generally to dewatering apparatus of the type adapted to screen solids from a solids containing liquid slurry and, more particularly, to a dewatering apparatus of the type wherein the separation is effected by passing the solids containing slurry over the surface of a screen through which a substantial portion of the liquid in the slurry passes while the solids in the slurry can not pass through the openings in the screen.

The basic dewatering apparatus of the type to which the present invention relates is disclosed in U.S. Pat. No. 2,916,142 issued to Freerk J. Fontein. As disclosed therein, a solids containing slurry is supplied to the inlet end, i.e., upper edge, of an arcuate screen, commonly termed a sieve bend, to flow downwardly over the concave surface of the arcuate screen in a substantially tangential direction. A substantial portion of the liquid in the slurry and any undersize solids pass through the openings in the screen and are collected as a low solids underflow. The oversize solids in the slurry continue to flow over the concave surface of the screen under the force of gravity to the discharge end, i.e., lower edge, of the screen and are collected as a concentrated solids overflow.

A modern adaptation of this basic dewatering apparatus is shown in U.S. Pat. No. 4,519,902 issued to Greever C. Kinder. Disclosed therein is a dewatering apparatus incorporating a screening member having an arcuate sieve bend upper portion which discharges onto a lower flat portion. The screening member is mounted directly to a support frame which forms the main body of the apparatus. To enhance the flow of slurry over the screening member, the support frame is operatively connected to a vibrating means which imparts a vibratory motion to the screen surface. It is said that the vibratory motion results in a further dewatering of the slurry therefor providing a more concentrated overflow.

In both of the aformentioned patents, a unitary screen member is provided having a screen surface formed of a plurality of spaced bars which extend transversely in a direction generally perpendicular to the direction of slurry flow downwardly over the screen surface. The bars are spaced apart a distance less than their width to form slit-like openings in the screen member between adjacent bars having a predetermined desired width so as to provide the desired straining effect. The bars may be rectangular, trapezoidal, or triangular in cross-section.

As noted in the aforementioned patents, it is desirable that the screen member of this type of dewatering apparatus be designed to be reversible so that the original inlet end of the screen member becomes the discharge end and vice-versa. Since the greatest wear is on the leading edge, with respect to slurry flow over the screen surface, of the screen bars forming the screen member, a more uniform wear on the screen member can be obtained by reversing the screen member thereby prolonging the life of the screen member.

In order to permit the screen member to be reversed, it is necessary that the screen member be designed to be removably mounted to the dewatering apparatus. In U.S. Pat. No. 4,519,902, the screen member is held in place by a wedge assembly which comprises a wooden member and a clip which secure the screen member at various positions along its lateral edges to the side flanges of the dewatering apparatus. It is also known in the art to form the screen member itself with lateral flanges which extend upwardly along the sides of the screen surface. The flanges are bolted to the lateral flanges of the dewatering apparatus to securely, yet removably hold the screen member in place.

However, in practice screen members secured in the manners previously described are often difficult to remove and reverse. It is not uncommon for the frame of the dewatering apparatus to be constructed for cost reduction purposes of materials which are subject to corrosion by the slurry flow. Typically, it requires two men four to five hours to remove and reverse a screen member of this type which has been bolted to the frame of the dewatering apparatus.

SUMMARY OF THE INVENTION

The screen deck assembly of the present invention comprises a support frame, a screen member adapted to be removably mountable to the support frame, and releasable fastening means for mounting the screen member to the support frame which in turn is fixedly mounted to the structure of the dewatering apparatus. The fastening means are readily releasable so that the screen member may be dismounted from the support frame, reversed and remounted by again engaging the fastening means into the reassembled screen member and support frame.

The support frame has a pair of laterally spaced side flanges and plurality of spaced support bars which extend transversely between the spaced side flanges. At least one of the support bars has a plurality of screen mounting holes formed therein for receiving the fastening means. The spaced side flanges of the screen support frame are adapted to be fixedly mounted in the dewatering apparatus.

The screen member has an inlet end for receiving the slurry mixture and an discharge end spaced longitudinally from the inlet end in the direction of slurry flow across the screen member. The screen member is comprised of a plurality of laterally spaced apart longitudinally extending base members and a plurality of elongated surface members disposed at closely spaced intervals to extend transversely atop the base members thereby providing a screening surface having a plurality of parallel spaced slot-like openings formed therein.

To facilitate the mounting of the screen member to the support frame in a readily removable manner in accordance with the present invention, a plurality of holes are formed in the screen member to extend through its screening surface. Each of the holes is positioned to mate with a corresponding mounting hole in the screen support frame when the screen member is positioned atop the screen support frame for mounting thereto. Preferably, a washer-like annular ring is disposed atop the screening surface about each hole formed therein to provide a contact surface against which the fastening means abuts when inserted in the hole.

To mount the screen member atop the support frame, a fastening means is inserted into each set of mating holes in the assembled screen deck assembly. Each fastening means is adapted when inserted into a hole in the screen member to extend into and through the corresponding mounting hole in the support frame mating therewith, thereby locking the screen member in mounting relationship with the screen support frame until the fastening means is withdrawn.

In a preferred embodiment, the fastening means comprises a sleeve member and a pin member adapted for insertion into the sleeve member. The sleeve member has an elongated axially extending hollow cylindrical member which has an annular ring extending radially outwardly therefrom at one end and a plurality of axially extending slits cut in the other end thereof. When the axially elongated cylindrical portion of the sleeve is inserted into a hole in the screen member, it extends therethrough such that the slit end thereof protrudes out of the back side of the support frame. The annular ring portion of the sleeve abuts against the washer-like ring mounted to the screen member when the sleeve is inserted into a hole in the screen member. The pin member is then inserted into the sleeve member thereby causing the slit end of the sleeve to extend radially outwardly to lock the sleeve into position in the mated holes. To dismount the screen member from the support frame, the pins are forcibly withdrawn from their sleeves and the sleeves are then withdrawn from their holes to free the screen member for removal.

DETAILED DESCRIPTION OF A PREFERRED EMBODIMENT

Figure 1:
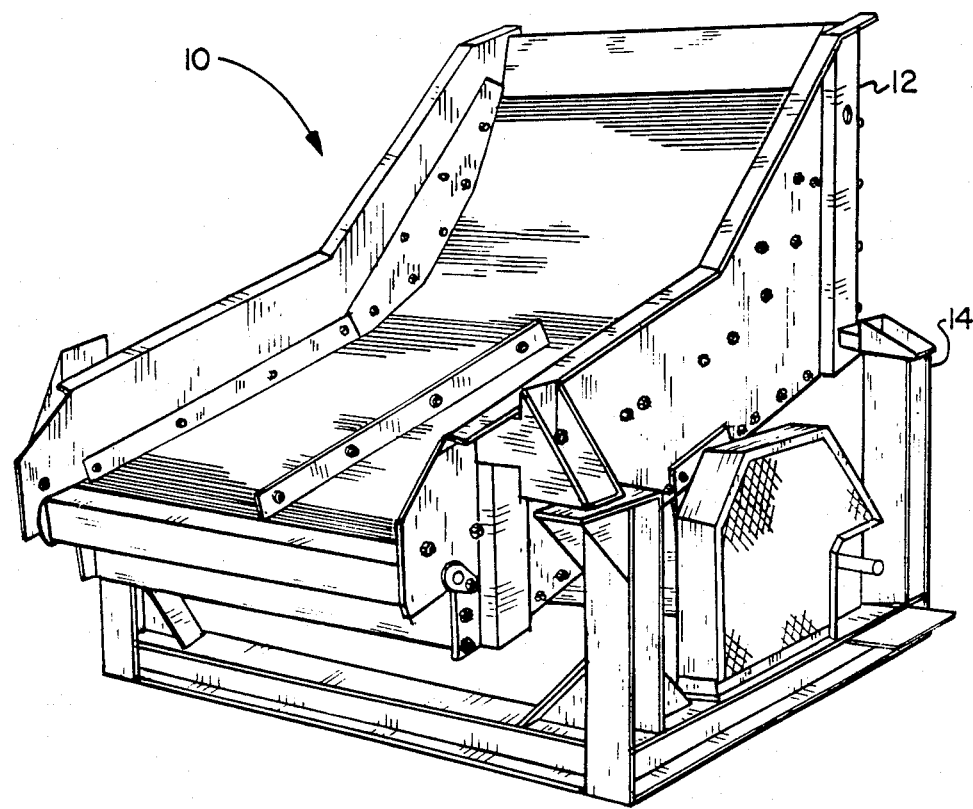
FIG. 1 is a cross-sectional elevational view of a dewatering apparatus incorporating the screen deck assembly of the present invention.

Referring now to the drawing and more particularly FIG. 1 thereof, there is shown therein in perspective view a dewatering apparatus (10) of the general type to which the present invention applies. As shown therein, an arcuate screen deck assembly (20) and a planar screen deck assembly (30) are mounted, typically by bolting, to the inside of the dewatering apparatus frame (12). The arcuate screen deck assembly (20) and the planar screen deck assembly (30) are mounted in series such that the flow passing over the acruate screen deck assembly (20) discharges onto the planar screen deck assembly (30). Additionally, the planar screen deck assembly (30) is inclined at an angle with the horizontal so that the flow received by the planar screen deck assembly (30) from the arcuate screen deck assembly (20) will continue to flow down hill thereover under the influence of gravity. The frame (12) of the dewatering apparatus (10) is mounted to a support framework (14) either in a stationary manner as shown in the drawing or in such a manner as operatively associated with the refribratory means as disclosed in U.S. Pat. No. 4,519,902 hereinbefore referred to.

Figure 2:
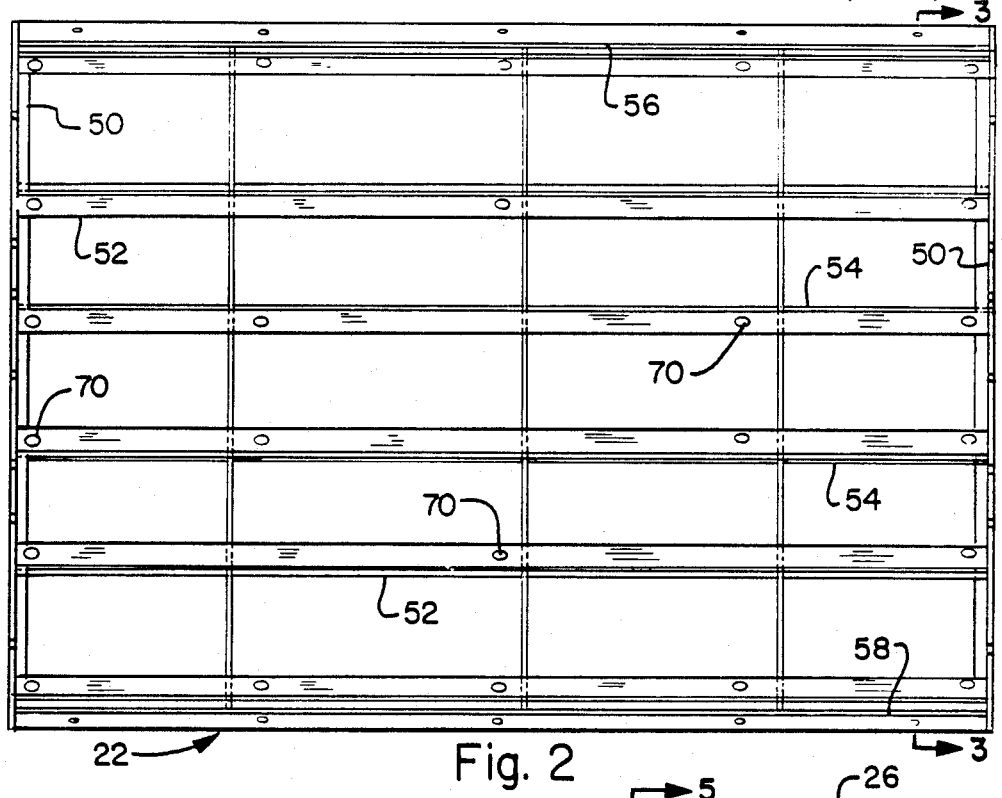
FIG. 2 is a plan view of the screen support frame of the screen deck assembly of the present invention.
Figure 3:
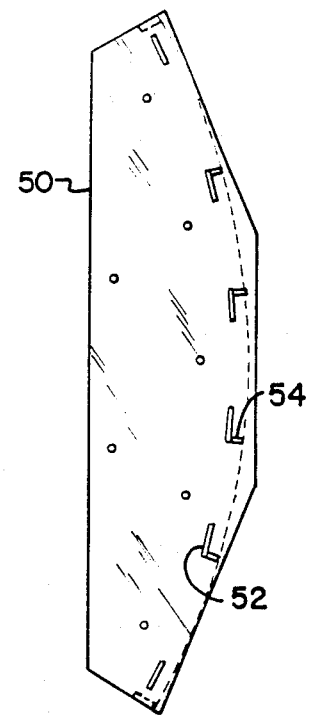
FIG. 3 is a cross-sectional elevational view of the screen support frame taken along line 3—3 of FIG. 2.

The arcuate screen deck assembly (20) of the present invention comprises a support frame (22), a screen member (24) adapted to be removably mountable to the support frame (22), and releasable fastening means (40) for mounting the screen member to the support frame which in turn is bolted to the dewatering apparatus frame (12). As best seen in FIGS. 2 and 3, the support frame (22) of the arcuate screen deck assembly (20) is comprised of a pair laterally spaced upright side flanges (50) and a plurality of spaced support bars (52) which extend transversely between the laterally spaced side flanges (50). The transversely extending support bars (52) are longitudinally spaced from each other at a relatively wide interval of several times their width. Preferably, a plurality of stiffening members (54), typically bars which are oriented to extend perpendicularly to the support bars (52), are disposed beneath the support bars (52) at similarly spaced intervals to extend transversely between and to connect the side flanges (50) for adding further structural strength to the screen support frame (22). Preferably, a top flange (56) and a lower flange (58) extend transversely along the upper and lower edges of the screen support frame (22) transversely between the side flanges (50).

To provide for the screen support deck assembly to be installed in the dewatering apparatus (10), the side flanges (50), and preferably also the upper and lower flanges (56,58) are drilled at appropriate locations to provide holes through which mounting bolts will be threaded into mating holes formed in the inside walls of the support frame (22) of the dewatering apparatus (10). The support frame (22) of the screen deck assembly (20) is bolted into position as best seen in FIG. 1 to provide a base onto which the removable screen is supported within a dewatering apparatus (10). Although the screen support frame (22) may be made of mild steel or stainless steel, it is preferred that stainless steel be used, as the screen support frame (22) will then have a long lifetime and may be left in position mounted within the frame (12) of the dewatering apparatus (10) for a long period of time over which many screen reversals and replacements may be made.

To accommodate the mounting of the screen member (24) to the screen support frame (22), holes (70) are drilled through at least one, and preferably all, of the support bars (52) at appropriate positions as best seen in FIG. 2. The holes (70) are sized with the diameter just sufficient to receive the fastening means (40) by which the screen member (24) will be locked into the screen support frame (22). Preferably, each bar (52) has a hole drilled in the end near each lateral end surface thereof adjacent the side flanges (50) and one or more holes (70) therein at spaced intervals along the transverse extent of the bar (52).

Figure 4:
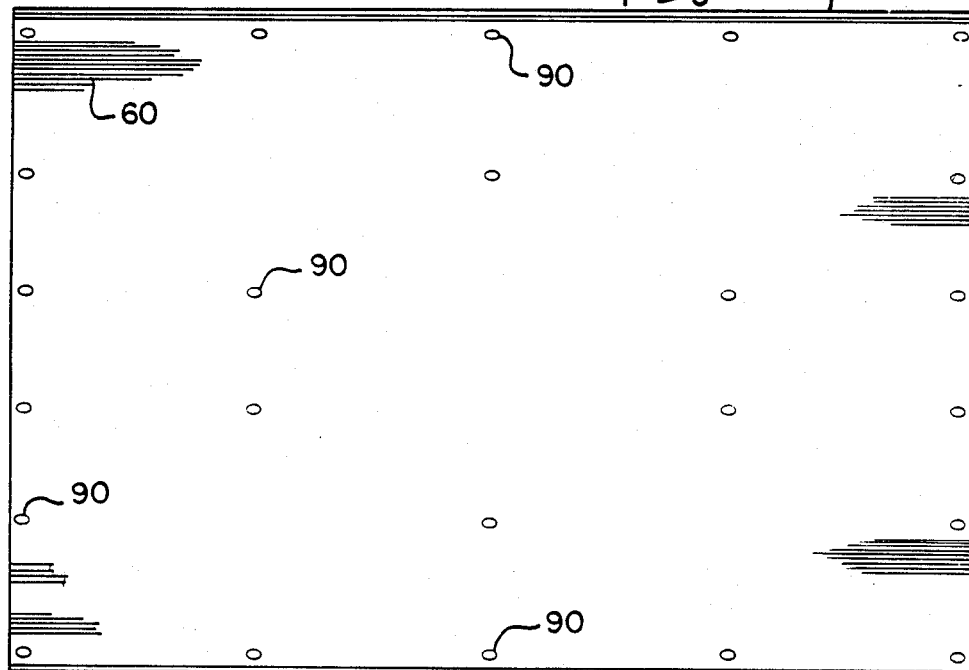
FIG. 4 is a plan view of the screen member of the screen deck assembly of the present invention.
Figure 5:
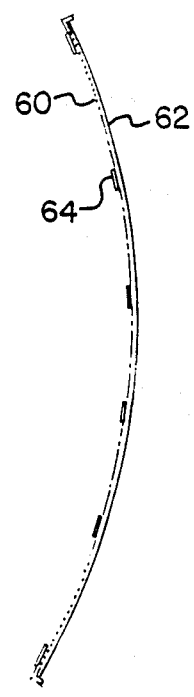
FIG. 5 is a cross-sectional elevational view of the screen member taken along line 5—5 of FIG. 4.

As best seen in FIGS. 4 and 5, the arcuate screen member (24) has a generally concave shape following the circumference of a circle extending from an inlet end (26) at its upper edge for receiving the slurry mixture to be dewatered and a discharge end (28) spaced longitudinally from the inlet end in the direction of slurry flow along the screen member. The screen member (24) is formed of a plurality of individual parallel relatively closely spaced surface members (60) which extend transversely with respect to fluid flow across the screen member (24) parallel to the upper and lower edges of the screen member (24). The surface members (60) are preferably in the shape of inverted triangles, with the base of the triangle forming the screening surface, although it is to be understood that the present invention contemplates utilizing any acceptable cross-sectional shape for the surface members (60), including but not limited to a rectangular or trapezoidal cross-section. Each of the surface members (60) is disposed atop and welded to a plurality of laterally spaced apart longitudinally extending base members (62) which extend from the upper edge of the screen member (24) to the lower edge of the screen member (24) beneath the surface members (60) in a direction substantially parallel to the flow along the surface of the screen member (24). Preferably, the base members (62) are cylindrical rods although other cross-sectional shapes may be utilized as the sole purpose of the base member (62) is to support the surface members (60). For an arcuate screen member, the base members (62) are of course bent along the desired curve which the screen member (24) is to have so as to define the arcuate curvature of the screen member (24).

In accordance with the present invention, a plurality of holes (90) are formed by appropriate means, such as, by punching, cutting or drilling, in the surface of the screen member (24). The holes (90) are positioned in the screen member (24) such that when the screen member (24) is placed on the screen support frame (22), each hole (90) in the screen member (24) mates with a corresponding hole (70) in the screen support frame (22). The holes (90) formed in the screen member (24) are sized to loosely receive a fastening means (40) to facilitate mounting of the screen member (24) to the support frame (22). In order to protect the fastening means from the sharp edges of the surface members (60) of the screen member (24) a washer-like ring (64) is disposed about each hole (90) formed in the screen surface. The washer-like ring (64) is preferably tack welded from beneath the screen member (24) to the surface members (60) of the screen member (24). Preferably, the internal diameter of the annular washer-like ring (64) is sized to snugly receive the fastening means (40) and provide an annular surface 66) against which the fastening means (40) will abut so as to preclude the fastening means (40) from passing through the hole (90) formed in the screen member (24) and provide a good contact surface for holding the screen member (24) to the support frame (22) when the fastening means (40) are installed and engaged.

Figure 6A:
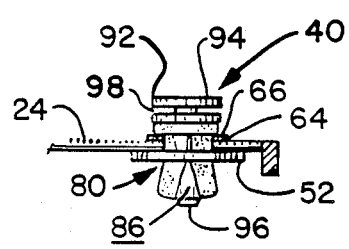
FIGS. 6a and 6b are enlarged cross-sectional elevational views illustrating the fastening means for mounting the screen member to screen support frame to form the screen deck assembly of the present invention.
Figure 6B:
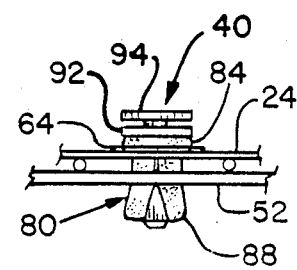

In a preferred embodiment of the present invention, the fastening means (40) comprises a sleeve member (80) and a member (92) adapted for insertion into the sleeve member (80). The sleeve member (80) has an elongated axially extending hollow cylindrical body which has an annular rim (84) extending radially outwardly therefrom at its head (94) and a plurality of axially extending slits (86) cut in the base tip (88) of the body of the fastening means (40) as best seen in FIGS. 6a and 6b. The annular rim (84) at the head (94) of the sleeve member (80) abuts against the washer-like annular ring (64) mounted to the screen member (24) when the sleeve (80) is inserted into a hole (90) in the screen member (24). The pin member (92) is adapted to be insertable under force into the hollow cylindrical core of the sleeve (80). Typically, the pin (92) would be inserted into the sleeve (80) by hammering and removed therefrom by using leverage applied to the head of the pin by means of a screwdriver or other tool. The head of the pin (92) extends radially outwardly from the cylindrical body (96) of the pin (92) to provide an annular contact surface which will abut the annular rim (84) of the sleeve (80) which in turn abuts the annular contact surface (66) provided by the ring (64) mount to the screen member (24) when the pin has been fully inserted to the sleeve (80). Additionally, the head (94) and the pin (92) may have a circumferential groove formed therein to accommodate the insertion of a screwdriver or other tool to facilitate removal of the pin (92) from the sleeve (80) by applying leverage on the pin by means of the tool inserted into the circumferential groove (98).

To mount the screen member (24) to the screen support frame (22) to form the screen deck assembly, the screen member (24) is merely placed atop the screen support frame (22) such that the holes (90) in the screen member (24) align with the holes (70) in the screen support frame (22). When properly aligned, the sleeve (80) is inserted into the hole (90) until it abuts the contact surface (66) provided by the annular ring (64) about the hole (90). When so inserted, the base tip (88) in which the slits (86) are formed extends through the hole (70) in the screen support frame (22). At this point, a pin (92) is hammered or otherwise forced into the cylindrical hollow core of the sleeve (80) until the head (94) of the pin (92) contacts the upper surface of the annular rim (84) of the sleeve (80). When so inserted, the body of the pin (96) extends completely through the cylindrical core of the sleeve (80) and causes the base tip (88) to bulge outwardly as the slits (86) expand under the pressure applied by the pin body (96). With the fastening means (40) so engaged in each set of mating holes (70,90), the screen member (24) is securely locked in position atop the screen support frame (22) and the dewatering apparatus (10) is ready for operation.

To dismount the screen member from the support frame for reversal at appropriate intervals, it is merely necessary to forceably withdraw, typically by leverage as hereinbefore noted, each pin (92) from its sleeve (80). The sleeves (80) may then be removed from the sets of holes (70,90) to fully release the screen member (24) from the screen support frame (22). The screen member (24) may then be removed, cleaned and reversed or replaced as required. To remount the screen member (24) to the screen support frame (22), the sleeves (80) are again inserted in each of the paired holes and the pins (92) driven into the sleeves (80) as hereinbefore described. With the screen deck assembly of the present invention, it takes a single worker about one-half of an hour to remove, reverse and remount the screen.

Although the screen deck assembly of the present invention has been described herein with the reference to the arcuate screen deck assembly (20), it is to be understood that the planar screen deck assembly (30) is preferably formed also in a modular design having a screen member which is substantially identical to the arcuate screen member (24) except that it is planar in form and a screen support frame which is substantially identical to the arcuate screen support frame (22) except that it also is in planar form. The planar screen member would be held to the planar screen frame by the fastening means (40) in the same manner as hereinbefore described with the arcuate screen deck assembly (20). The planar screen deck assembly (30) would be mounted by bolting its side flanges to the inside of the frame (12) of the detwatering apparatus (10) in the same manner by which the arcuate screen deck assembly (20) is mounted to the inside of the frame (12) of the dewatering apparatus (10). Accordingly, the scope of the present invention is to be interpreted by the appended claims as to

We claim:

1. A screen deck assembly adapted for mounting in a dewatering apparatus of the type adapted for the wet-screening of slurry mixtures containing solid particles entrained in a liquid to effectuate separation of the solid particles from the liquid, said screen deck assembly comprising:

a. a screen support frame having a pair of laterally spaced side flanges and a plurality of spaced support bars extending transversely between the spaced side flanges, at least one of said support bars having a plurality of screen mounting holes formed therein, the side flanges of said screen support frame adapted to be fixedly mounted in the dewatering apparatus;

b. a screen member adapted to be removably mountable to said screen support frame, said screen member having an inlet end for receiving the slurry mixture and a discharge end spaced longitudinally from the inlet end in the direction of slurry flow across said screen member, said screen member having a plurality of laterally spaced longitudinally extending base members and a plurality of elongated surface members disposed at closely spaced intervals from the inlet end of said screen member to the discharge end of said screen member to extend transversely atop said base members thereby forming a screening surface, said screen member having a plurality of holes extending through its screening surface, each of said plurality of holes positioned to mate with a corresponding mounting hole in said screen support frame when said screen member is positioned atop said screen support frame for mounting thereto; and c. a plurality of fastening means for removably mounting said screen member to said screen support frame, each of said fastening means adapted for insertion into a hole in said screen member so as to extend into and through the mounting hole in said screen support frame mating with the hole in said screen member into which said fastening means is inserted, thereby locking said screen member in mounting relationship to said screen support frame until said fastening means is withdrawn, each of said fastening means comprising in combination a sleeve member and a pin member, said sleeve member having an elongated axially extending hollow cylindrical member adapted to be inserted into and extend through a pair of mated holes in said screening member and said screen support frame, the hollow cylindrical member having an annular ring extending radially outward therefrom at one end and a plurality of axially extending slits cut in the other end thereof, the annular ring extending outwardly so as to limit the insertion of the sleeve member into the paired holes, and said pin member adapted for insertion into the sleeve member thereby causing the slit end of the sleeve to expand radially outwardly; and d. a plurality of annular washer members disposed atop said screen member, one above each hole in said screen member so as to provide a contact surface against which the annular ring portion of said sleeve member abuts when inserted in the hole.

* * * * *